United States Patent [19]

Ghazarian

[11] Patent Number: 5,045,838
[45] Date of Patent: * Sep. 3, 1991

[54] METHOD AND SYSTEM FOR PROTECTING AUTOMOTIVE APPLIANCES AGAINST THEFT

[76] Inventor: John Ghazarian, 13313 Oxnard St. #226, Van Nuys, Calif. 91401

[*] Notice: The portion of the term of this patent subsequent to Mar. 6, 2007 has been disclaimed.

[21] Appl. No.: 535,656

[22] Filed: Jun. 11, 1990

[51] Int. Cl.⁵ .............................................. G08B 13/14
[52] U.S. Cl. .................................... 340/457; 340/426; 340/568; 455/346
[58] Field of Search ............... 340/457, 426, 568, 572, 340/686, 687; 307/10.2; 361/391; 455/346

[56] References Cited

U.S. PATENT DOCUMENTS

| | | | |
|---|---|---|---|
| 3,649,960 | 3/1972 | Severn | 340/457 |
| 3,654,600 | 4/1972 | Yamamoto | 340/457 |
| 4,427,967 | 1/1984 | Maiocco | 340/457 |
| 4,679,026 | 7/1987 | Krakowski et al. | 340/426 |
| 4,758,817 | 7/1988 | Akiyama | 340/568 X |
| 4,794,368 | 12/1988 | Grossheim et al. | 340/426 |
| 4,805,233 | 2/1989 | Robitschko et al. | 340/426 X |
| 4,866,416 | 9/1989 | Holzhauer et al. | 340/568 X |
| 4,906,969 | 3/1990 | Ghazarian | 340/426 |

Primary Examiner—Joseph A. Orsino
Assistant Examiner—Brian R. Tumm
Attorney, Agent, or Firm—William E. Mouzavires

[57] ABSTRACT

An alarm or indicating system for indicating that an automotive appliance has been left in the vehicle. The system includes a circuit powered by the battery of the vehicle and a first switch which is closed by inserting the appliance into a predetermined position in the vehicle and opened by removing the appliance from the predetermined position. The circuit further includes a control switch that is operated by the door of the vehicle such that when the door is opened the control switch will be closed to energize the circuit of the appliance is in its predetermined position. When the operator removes the appliance it will open the first switch to de-energize the circuit and the alarm. When the door of the vehicle is closed the control switch will be opened and the alarm circuit will be de-energized.

13 Claims, 3 Drawing Sheets

METHOD AND SYSTEM FOR PROTECTING AUTOMOTIVE APPLIANCES AGAINST THEFT

RELATED PATENT

This application is related to my prior U.S. Pat. No. 4,906,969 issued Mar. 6, 1990. The disclosure of my aforementioned patent, is hereby incorporated in its entirety by reference into the subject application as part of the subject application.

OBJECTS OF THE PRESENT INVENTION

It is an object of the present invention to provide a novel method and system for preventing theft from automobiles, trucks, vans or other vehicles, of appliances such as radios, cassette players, television sets, telephones, VCRs, facsimile machines, computers and other similar appliances. More specifically the present invention is an improvement over my prior method and system disclosed in my prior U.S. Pat. No. 4,906,969 identified above.

A further objection of the present invention is to provide such an improved method and apparatus for signaling to the operator of an automotive vehicle to remove an appliance from the vehicle before leaving the vehicle. Included herein is such method and apparatus which may utilize the door of the vehicle to actuate a switch to energize the indicating means when the door of the automobile is opened while the appliance still remains in the vehicle.

SUMMARY OF THE INVENTION

In one preferred embodiment of the present invention, an audible and/or visual alarm or indicating means utilizes a switch such as is actuated by the door of the automobile when opening or closing the door. When the door of the vehicle is closed this control switch will be in open position. The appliance when installed closes an associated switch through a circuit connected to the indicator however as long as the control switch is open the indicator will not be energized. When the door of the vehicle is opened while the appliance still remains in the vehicle in its predetermined position, the control switch will close to energize the indicator which signals to the operator that the appliance is still in the vehicle and should be removed. Once the appliance is removed the switch associated with the appliance will open and the indicator will be de-energized. In the preferred embodiment a diode is inserted in the indicator circuit between the switch associated with the appliance and the indicator to protect the indicator from undesired B+ positive signals which could come from the vehicle or switching device.

DRAWINGS

Other objects and advantages of the present invention will become apparent from the following more detailed description taken in conjunction with the drawings in which.

DETAILED DESCRIPTION

Figure 1:
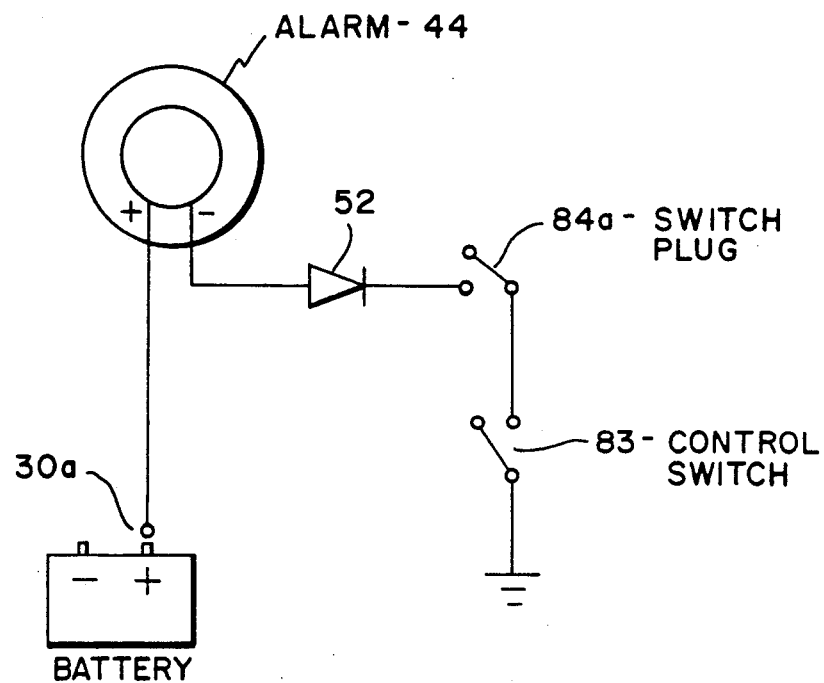
FIG. 1 is a schematic view of an indicator circuit included in one preferred embodiment of the present invention.
Figure 3:
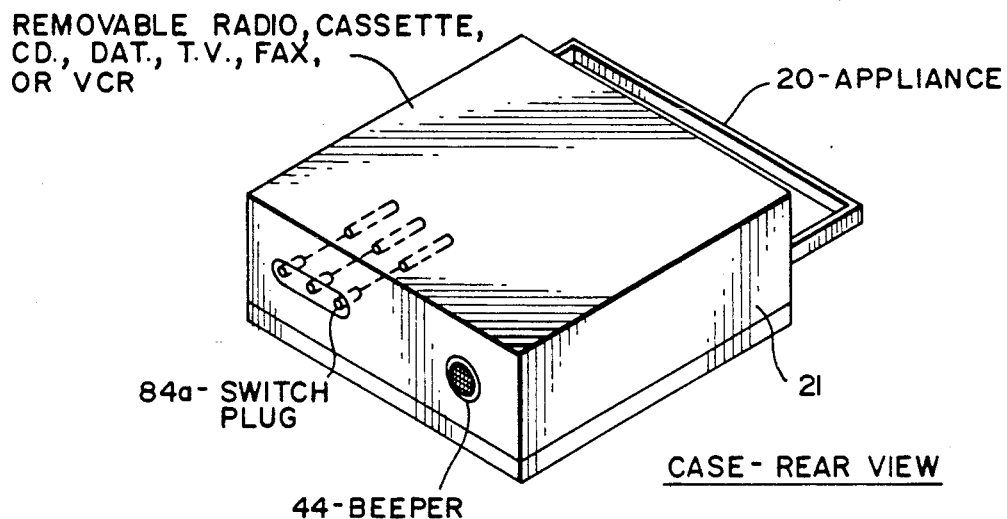
FIG. 3 is a perspective view of an appliance as seen from above the rear end thereof and incorporating portions of a circuit such as those shown in FIGS. 1 and 2.
Figure 4:
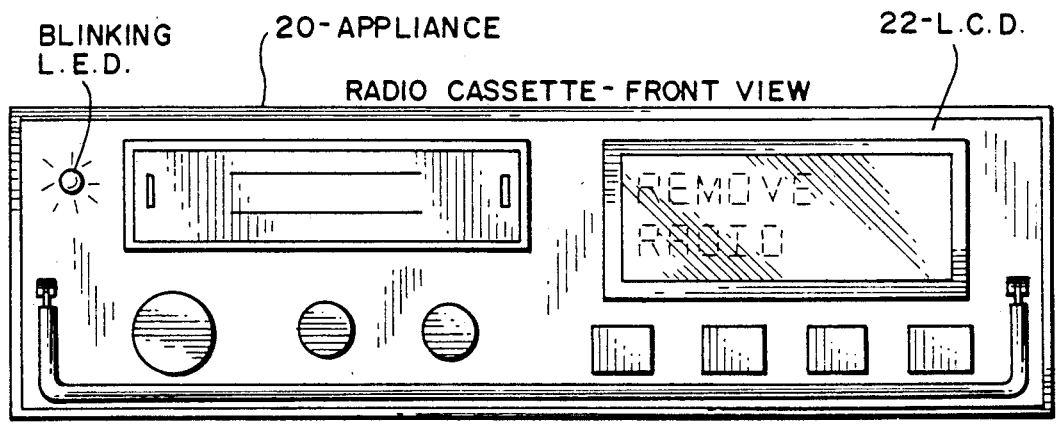
FIG. 4 is a front, fragmental, elevational view of an automobile-dashboard panel incorporating the system of the present invention.
Figure 5:
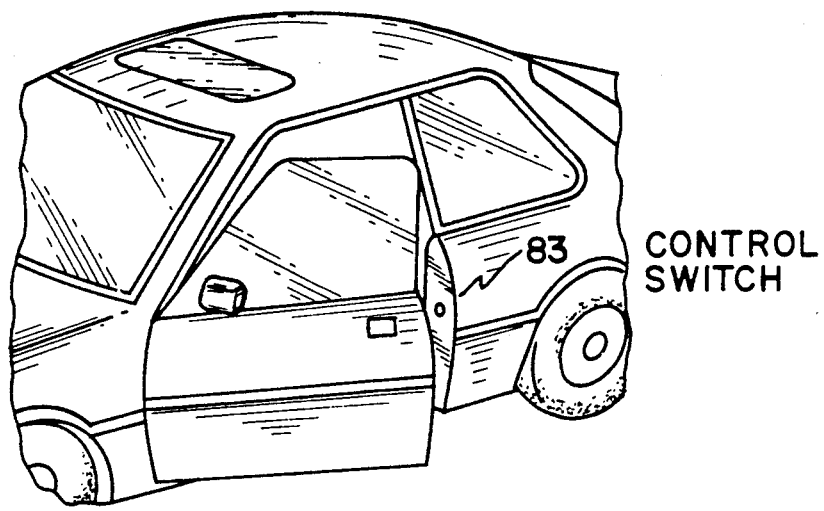
FIG. 5 shows a vehicle with a door and a control switch.
Figure 6:
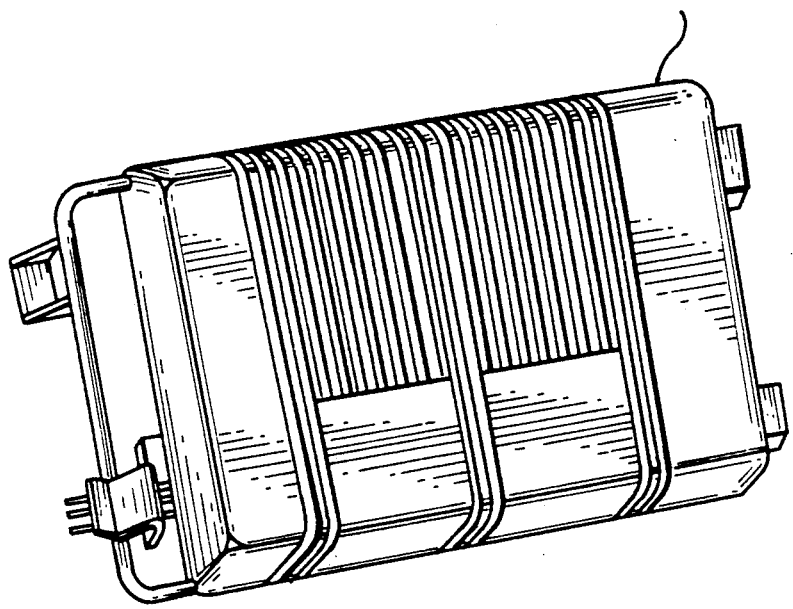
FIG. 6 shows a known remote control switching device.

Referring now to FIG. 1 there is shown for illustration purposes only, a preferred embodiment of the present invention including an indicator generally designated 44 which may be any device which will issue an audible or visual alarm or indicating signal such as a beeper, a voice chip, a light emitting diode, and any other suitable light and/or visual or audible display. The indicator is preferably powered by the power source of the associated vehicle such as for example a twelve-volt battery which of course includes a terminal 30a for connection to the positive side of the indicator. The appliance 20 such as shown in FIG. 3 has a switch plug 84a associated with it which, when the appliance is installed in its predetermined position in the vehicle, establishes a circuit through the negative side of the indicator as shown in FIG. 1. The appliance may be any appliance including a radio, cassette, CD, computer, television, facsimile machine, VCR, etc. which is removable from the vehicle and reinsertable into the vehicle in the predetermined position of the appliance. That position with respect to a radio may be for example in or under the dashboard. When the appliance is removed from its predetermined position in the vehicle, the switch 84a will of course be opened or disconnected to deenergize the indicator circuit. Although a plug switch is preferred, it will be understood that any other switch may be utilized in association with the appliance for energizing or de-energizing the indicator circuit.

The indicator circuit is also controlled by a control switch generally designated 83 which in the preferred embodiment is a pin switch mounted between the door and frame of the vehicle with one end of the switch grounded to the frame of the vehicle as indicated in FIG. 1. Such switches per se are of course conventional and no further description is necessary. In the preferred embodiment the pin switch 83 is in normally open position when the associated vehicle door is closed thus providing no connection to ground and no activation of the indicator 44. When the door is opened switch 83 is closed thus providing ground connection to switch plug terminal 84a. A diode 52 is preferably inserted in the circuit between the switch plug 84a and the negative side of the indicator 44 to protect audio-visual alarm devices from undesired B+ positive signals emanating from the vehicle or switching device.

When the appliance 20 is inserted into its predetermined position in the vehicle, switch plug 84a is closed and providing the vehicle door is closed, the pin switch 83a will be in open position and the indicator 44 will not be energized. However if the operator decides to leave the vehicle by opening the door without first removing the appliance 20 from its predetermined position, pin switch 83 will close thus sending a negative signal to switch plug 84a which will complete the circuit to energize indicator 44 telling the operator that the appliance is still in the vehicle and should be removed. Once the operator removes the appliance from its predetermined position in the vehicle, the switch plug 84a will be disconnected or in open position and the indicator will of course be de-energized.

Figure 2:
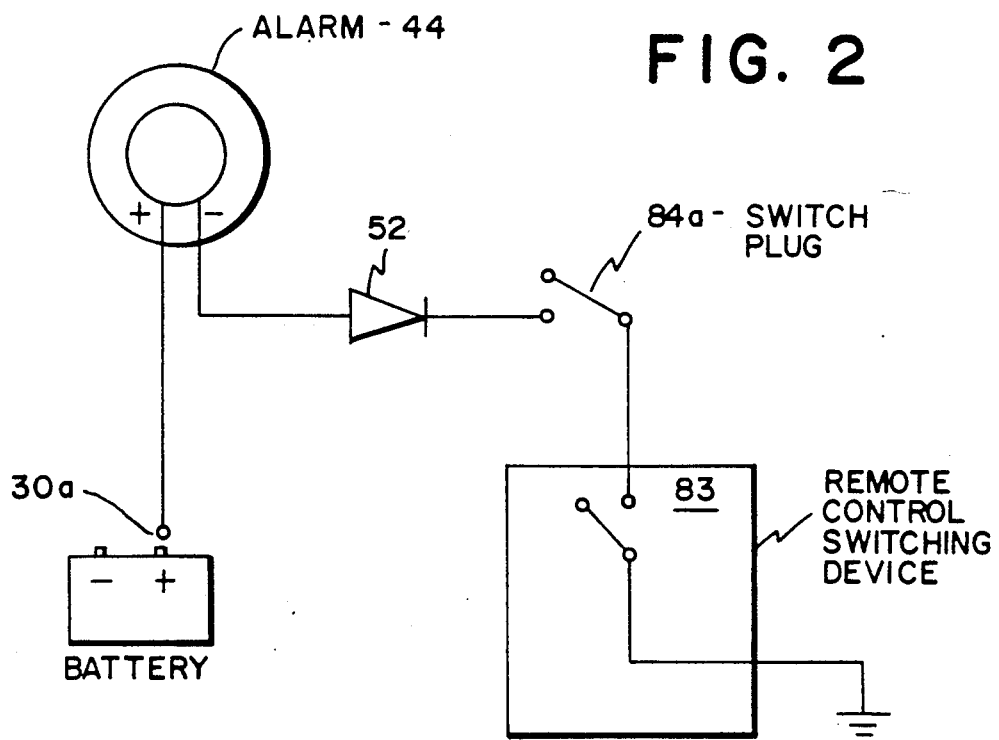
FIG. 2 is a view similar to FIG. 1 but including a modified remote control switching device.

Although the control switch 83 has been shown and described in connection with the embodiment of FIG. 1, any other suitable control switch may be employed such as the remote control switching device shown in FIG. 2.

I claim:

1. A method of protecting against theft an electronic appliance installed in an automotive vehicle comprising the step of releasably connecting the appliance to an indicating circuit to produce an alert signal when the operator leaves the vehicle without removing the appliance from a predetermined position in the vehicle.

2. The method defined in claim 1 further including the steps of using the predetermined position of the appliance in the vehicle to energize the signal only as long as the appliance remains in the predetermined position, and removing the appliance from said predetermined position to de-energize the signal.

3. The method defined in claim 1 further including the step of connecting the indicating circuit to a switch actuated by the door of the vehicle such that when the door is opened while the appliance is still in said predetermined position the circuit will be energized.

4. The method defined in claim 2 further including the step of connecting the indicating circuit to a switch actuated by the door of the vehicle such that when the door is opened while the appliance is still in said predetermined position the circuit will be energized.

5. An indicating system for indicating that an electronic appliance has been left in an automobile vehicle comprising in combination, indicating means for producing a signal, a circuit for energizing said indicating means including a first switch which is closed when the appliance is installed in a predetermined position in the vehicle and which is open when the appliance is removed from said predetermined position, and a control switch for energizing said circuit to energize said indicating means when the appliance is in said predetermined position and said control switch is in a first position.

6. The indicating system defined in claim 5 wherein said circuit is de-energized when said control switch is in an open position and wherein said first position of said control switch is a closed position which will cause the circuit to be energized if said first switch is in a closed position.

7. The indicating system defined in claim 6 further including means positioned between said first switch and said indicating means for protecting the indicating means from B+ signals which emanate from the vehicle or switching device.

8. In an automotive vehicle having an electronic appliance located in a predetermined operative position, said appliance being removable from said operative position, first switch means which is closed when the appliance is placed in said predetermined operative position and which is opened when the appliance is removed from said predetermined operative position; an indicator, a circuit for energizing and de-energizing said indicator including said first switch means, said circuit including a second control switch having a first position for energizing the circuit to energize the indicator when the appliance is in said predetermined operative position thereof, said circuit being de-energized when the appliance is removed from said predetermined position thereby opening said first switch means.

9. The combination defined in claim 8 wherein said control switch has an open position for de-energizing the circuit when the appliance is in said installed position.

10. The combination defined in claim 9 wherein the vehicle has a door for closing the control switch when the door is opened and for opening the control switch when the door is closed.

11. The combination defined in claim 9 wherein said control switch is a remote control switch.

12. The combination defined in claim 8 wherein said circuit includes a diode between said indicator and said first switch.

13. The combination defined in claim 8 wherein said first switch means is included in said appliance.

* * * * *